Patented Sept. 4, 1934

1,972,750

UNITED STATES PATENT OFFICE 1,972,750

AIR COMPRESSOR

Burton S. Aikman, Milwaukee, Wis., assignor to The Westinghouse Air Brake Company, Wilmerding, Pa., a corporation of Pennsylvania Application July 30, 1932, Serial No. 626,502

16 Claims. (Cl. 230—190)

This invention relates to fluid compressors and particularly motor driven air compressors of the reciprocating piston type having a piston ring inlet valve and an inlet chamber disposed above the crank chamber and beneath the compression chamber.

In compressors of the above noted type there is a tendency for lubricant to work upward from the crank chamber past the piston and to accumulate in the inlet chamber. This tendency is increased due to the fact that in the usual compressor, the pressure in the inlet chamber is lower than the atmospheric pressure existing in the crank chamber, and the higher fluid pressure in the crank chamber forces lubricant past the cross head portion of the piston into the inlet chamber.

An object of this invention is to equalize the fluid pressures in the inlet and crank chambers so as to minimize the tendency for lubricant to flow past the piston into the inlet chamber and to render feasible the gravity drainage into the crank chamber of the excess lubricant entering the inlet chamber.

A further object of the invention is to provide a compressor having the above noted improved characteristics with a lubricant drainage passage having means for preventing, while the compressor is operating, the lubricant thrown from rotating parts in the crank chamber from interfering with the drainage of lubricant from the inlet chamber to the crank chamber through the said passage.

A further object of the invention is to provide means associated with the pressure equalizing means and said chambers for silencing the air stream in said means and said chambers.

Figure 1:
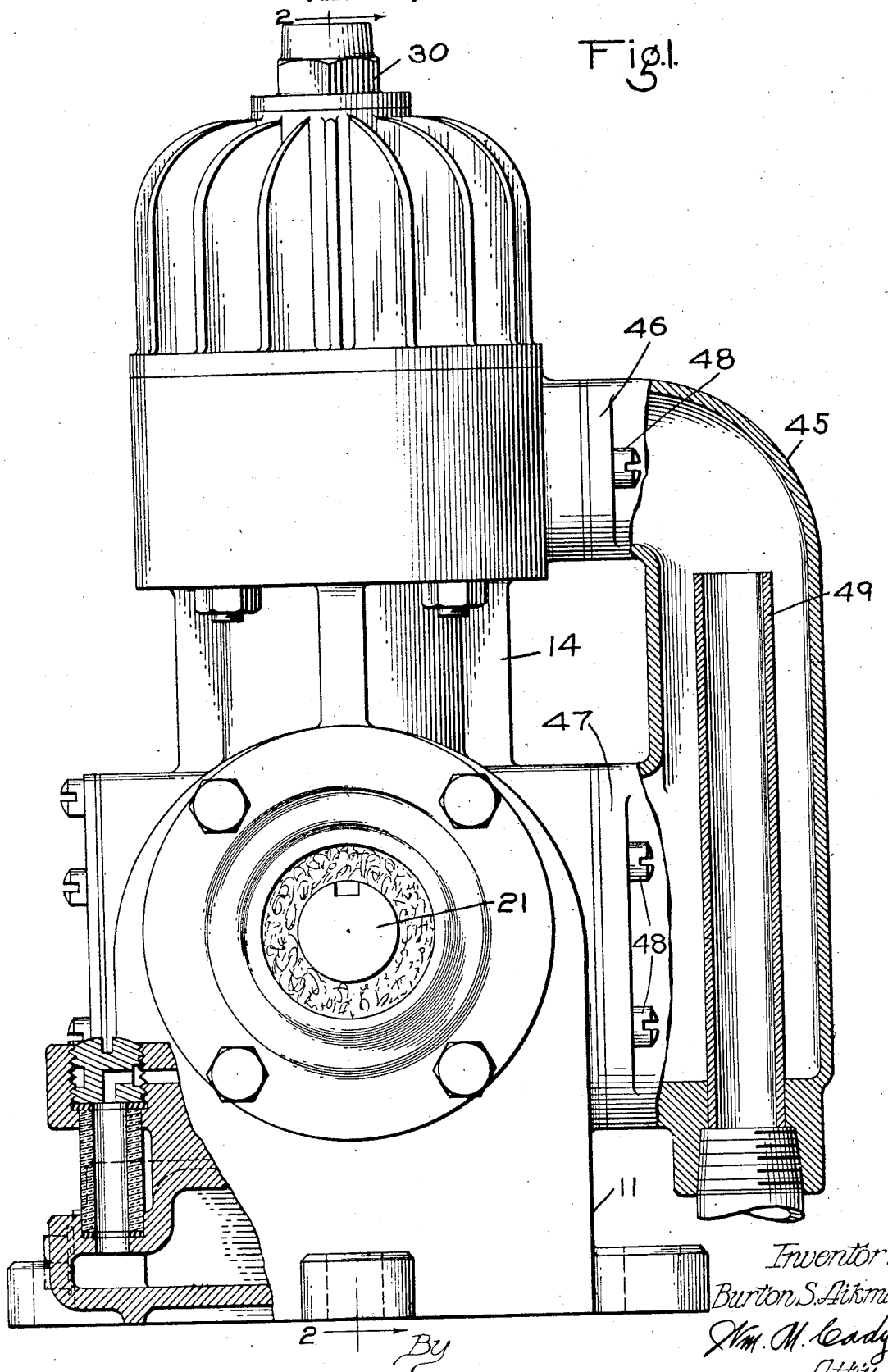
Figure 2:
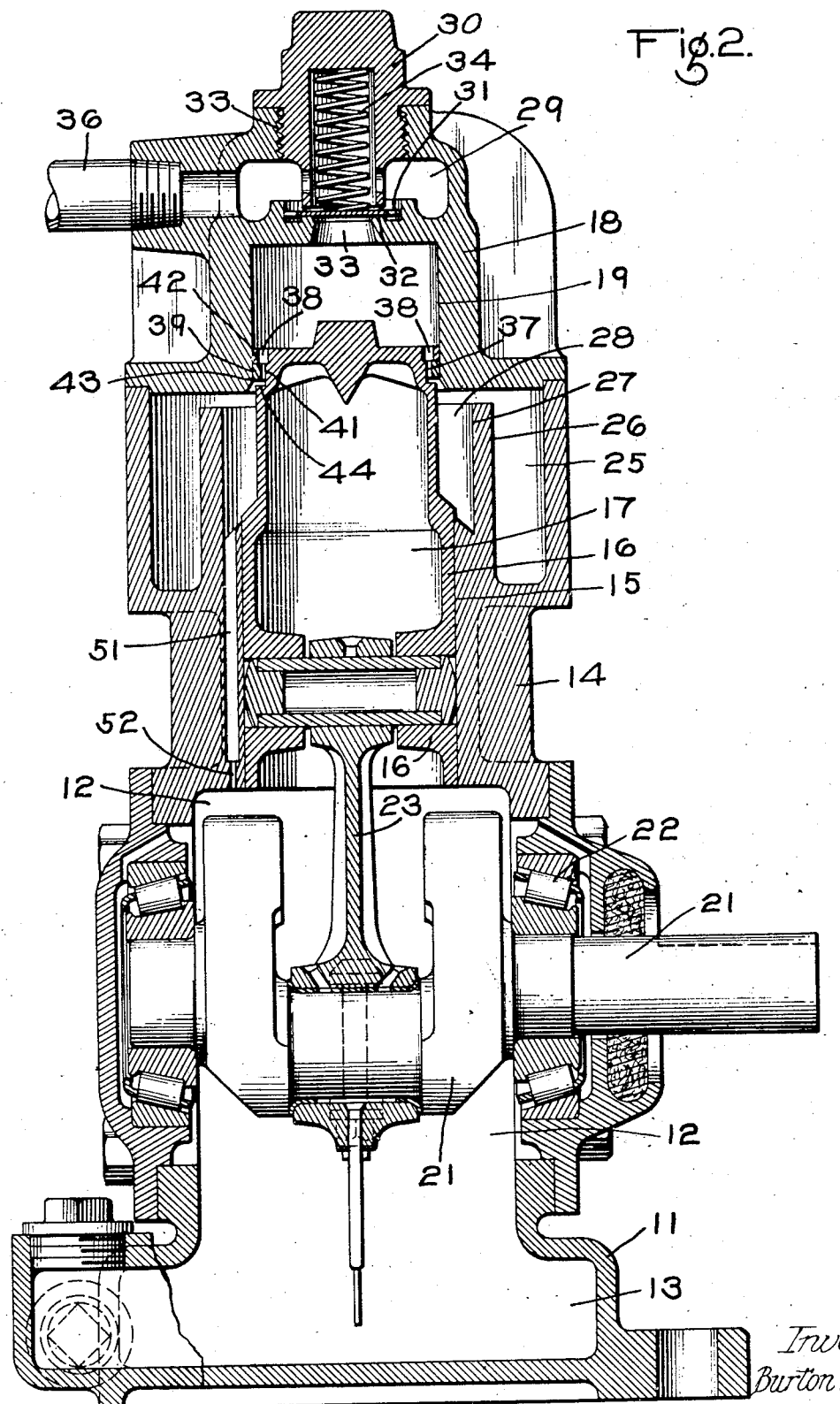

These and other objects of the invention that will be made apparent throughout the further description thereof are attained by means of the compressor apparatus hereinafter described and illustrated in the accompanying drawings; wherein, Fig. 1 is an elevational view, partially in section, of a compressor embodying features of the invention; and Fig. 2 is a sectional view, partially in elevation, of the compressor shown in Fig. 1, the section being taken along the axis of the crank shaft.

Referring to the drawings, the air compressor comprises a base or crank case section 11 having a crank chamber 12, the lower portion of which constitutes a lubricant reservoir 13. Upon the crank case section 11, a piston guide section 14 is mounted having a cylindrical guide-way 15 in which the cross head portion 16 of a reciprocating piston 17 operates. A head portion 18 containing a compression cylinder 19 is mounted upon the guide casing 14, the compression cylinder being adapted to receive the upper end of the piston 17.

The crank chamber 12 contains a crank shaft 21 that is mounted for rotation in tapered roller bearings 22 of the combined radial and thrust type, and a connecting rod 23 is pivotally connected to the crank shaft 21 and to the cross head portion 16 of the piston 17 in the usual well known manner. The crank shaft 21 is adapted to be driven by a motor and when rotated causes the piston 17 to be reciprocated within the guide cylinder 15 and the compression cylinder 19.

The guide casing 14 is provided with an inlet chamber 25 having its end closed by the head casing 18, and a portion 26 of the guide cylinder projects into the chamber 25 and is provided with a cylindrical bore 27 that is of greater diameter than the diameter of the guide cylinder 15 so as to provide a chamber 28 between the piston 17 and the wall of the guide cylinder for receiving any excess lubricant which may pass from the crank chamber 12 past the piston into the inlet chamber.

The head casing 18 is provided with a valve chamber 29 containing a valve disc 31 that is adapted to seat upon an annular seat rib 32 surrounding an opening 33 in the upper end of the compression cylinder 19. A threaded plug 30 serves to close the threaded opening 33 through which the valve disc 31 is inserted, and to support a spring 34 which serves to yieldingly press the valve disc 31 against the seat rib 32.

The valve disc 31 serves as an exhaust valve which permits the compressed air to pass from the compression cylinder 19 into the valve chamber 29 from whence it is conducted to a reservoir, not shown, through the pipe 36.

Upon the down stroke of the piston 17, suction is created in the cylinder 19 and the valve disc 31 is forced upon its seat 32 by the spring 34, thereby preventing a reflux of the compressed fluid into the compression cylinder 19.

The upper end of the piston 17 is provided with an intake valve of the well known ring type. The piston is provided with a ring groove 37 which is in communication with the compression cylinder through a series of ports 38. A piston ring 39 having less width than the width of the groove 37 is inserted in the groove. The ring 39 is of less thickness than the depth of the groove 37 and therefore a space 41 is provided between the bottom of the groove and the inner cylindrical face of the ring 39 through which fluid may pass from the inlet chamber 25 to the compression cylinder 19 through the ports 38 when the piston 17 is moving downward and the ring 39 is in engagement with the upper wall 42 of the groove 37. When the piston moves upward, the ring 39 is frictionally held at rest during the initial movement of the piston and when the lower face 43 of the ring engages the lower wall 44 of the groove 37, a seal is provided which prevents the escape of fluid from the compression cylinder 19 into the inlet chamber 25. The air drawn into the compression chamber 19 when the piston is moved downward is, therefore, trapped in the compression cylinder and compressed when the piston is moved upward. When the pressure of the fluid within the cylinder 19 exceeds that in the valve chamber 29, the valve disc is raised by the fluid under pressure acting on the under side thereof and permits the fluid under pressure within the cylinder 19 to flow to the valve chamber 29 and pipe 36.

Ordinarily the fluid pressure in the inlet chamber 25, while the compressor is operating, is lower than the atmospheric pressure existing in the crank chamber 12 due to suction created by the downward movement of the piston and because of this differential in fluid pressure within the two chambers, it has been difficult to return the lubricant accumulating in the inlet chamber to the crank chamber. To facilitate the return by gravity of lubricant in the inlet chamber to the crank chamber, provision is made in the improved compressor construction for equalizing the fluid pressures in the inlet and crank chambers. Equalization of the pressures of the fluid in such chambers materially reduces the tendency for the lubricant to pass the piston into the inlet chamber 25.

In order to equalize the pressure of the fluid in the inlet chamber and the crank chamber, an inlet conduit 45 is connected by flange couplings 46 and 47 to openings in the inlet chamber 25 and the crank chamber 12, by means of screws 48, thereby providing a communication between the said chambers having a relatively large flow area. By reason of this conduit connection, the pressure in the crank case is maintained at substantially that within the inlet chamber 25. Because of the intermittent opening of the intake ring valve in the piston, the air within the intake chamber 25 and the crank chamber 12 is caused to pulsate at a rate equivalent to the rate of reciprocation of the piston. The pulsation of the air within the said chambers and the conduit which connects them ordinarily produces an annoying sound, which it was found was substantially silenced by locating the air inlet of the compressor within the equalizing conduit and preferably at a point between the openings in the conduit which communicate with the said chambers. Best silencing results are obtained by providing an inlet nozzle 49 which enters the conduit 45 at the lower end thereof and extends through the conduit to a point adjacent the upper end thereof and near the opening into the inlet chamber 25, and by so proportioning the flow area of the air inlet nozzle 49 that a continuous flow of air from atmosphere into the conduit is maintained. The continuous flow of air from the atmosphere into the conduit and said chambers serves to break up such pulsation within the chambers and the conduit which would ordinarily produce the disagreeable noise and consequently the air stream into the compressor is substantially silenced.

Because the fluid pressures within the intake chamber and the crank chamber are substantially equalized, the lubricant may be drained from the inlet chamber 25 through a passage 51 leading from the chamber 28 within the chamber 25, to the crank chamber 12 and having a restricted passage 52 opening into the crank chamber. The area of the passage is reduced adjacent the opening into the crank chamber to prevent lubricant thrown by centrifugal force from the rotating crank shaft or parts within the crank chamber from being forced upwardly into the passage. It will be seen from the foregoing that the lubricant passing the piston and entering the chamber 28 in the inlet chamber 25 is freely returned to the crank chamber by gravity. Thus the danger of flooding the inlet chamber with lubricant is overcome.

While the invention is disclosed as applied to a single cylinder compressor, it will be understood that the invention is applicable to multi-cylinder compressors and that changes, additions and omissions may be made in the construction without departing from the spirit of the invention.

Having now described my invention, what I claim as new and desire to secure by Letters Patent, is:

1. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means for equalizing the pressures of the fluid in said inlet chamber and said crank chamber including a by-pass of materially greater flow capacity than said passage.

2. The combination with a fluid compressor having a crank chamber, a cylinder, a piston working in said cylinder and a fluid inlet chamber communicating with said cylinder and receiving excess lubricant passing said piston from said crank chamber, of means including a passage having a restricted portion and whereby the fluid lubricant entering said inlet chamber is returned by gravity to the crank chamber, and means for equalizing the pressure of the fluid in said inlet chamber and said crank chamber including a by-pass of materially greater flow capacity than said restricted portion of said passage.

3. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means for equalizing the pressures of the fluid in said inlet chamber and said crank chamber including a by-pass of materially greater flow capacity than said passage and having an inlet port opening into said by-pass.

4. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means for equalizing the pressures of the fluid in said inlet chamber and said crank chamber including a conduit communicating with said chambers through spaced openings and having an inlet port opening into said conduit at a point between said openings.

5. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means for equalizing the pressures of the fluid in said inlet chamber and said crank chamber including a conduit communicating with said chambers through spaced openings and having an inlet nozzle projecting into the conduit for discharging fluid into said conduit in the direction of flow of fluid in the conduit to said inlet chamber.

6. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means for equalizing the pressures of the fluid in said inlet chamber and said crank chamber including a conduit communicating with said chambers through spaced openings and having an inlet port so disposed in the conduit as to so affect the sound producing pulsating fluid in said conduit and chambers as to substantially silence said fluid.

7. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means including a fluid inlet conduit communicating with said inlet chamber and said crank chamber for equalizing the pressures therein, and for silencing the air stream in said chambers.

8. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, means including a conduit communicating with said inlet chamber and said crank chamber for equalizing the pressures therein, and means for supplying air to said conduit for silencing the air stream therein.

9. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, means including a conduit communicating with said inlet chamber and said crank chamber for equalizing the pressures therein, and means for silencing the air stream in the conduit and chambers including a conduit open to the atmosphere and communicating with said conduit and having a flow area of such proportions that a constant flow of air through the second said conduit into the first said conduit is maintained.

10. The combination with a compressor having a compression chamber, a crank chamber and a fluid inlet chamber intermediate the said chambers and a piston working in said chambers, of means including a passage whereby fluid lubricant passing the piston from said crank chamber and entering said inlet chamber is returned by gravity to the crank chamber, and means for equalizing the pressure in said inlet chamber and said crank chamber including a by-pass of materially greater flow capacity than said passage.

11. The combination with a fluid compressor having a crank chamber, a cylinder, a piston working in said cylinder and a fluid inlet chamber communicating with said cylinder and receiving excess lubricant passing said piston from said crank chamber, of means including a passage whereby the fluid lubricant entering said inlet chamber is returned by gravity to the crank chamber, and means for equalizing the pressures of the fluid in said inlet chamber and said crank chamber.

12. The combination with a fluid compressor having a crank chamber, a cylinder, a piston working in said cylinder and a fluid inlet chamber communicating with said cylinder and receiving excess lubricant passing said piston from said crank chamber, of means including a passage establishing communication from said inlet chamber to said crank chamber whereby the fluid lubricant entering said inlet chamber is returned to the crank chamber, and means for equalizing the pressures of the fluid in said inlet chamber and said crank chamber.

13. The combination with a fluid compressor having a crank chamber, a cylinder, a piston working in said cylinder and a fluid inlet chamber communicating with said cylinder and receiving excess lubricant passing said piston from said crank chamber, of means including a passage establishing communication from said inlet chamber to said crank chamber whereby the fluid lubricant entering said inlet chamber is returned to the crank chamber, and means for equalizing the pressures of the fluid in said inlet chamber and said crank chamber including a conduit communicating with said chamber through spaced openings and having an inlet port opening into said conduit at a point between said openings.

14. The combination with a fluid compressor having a crank chamber, a cylinder, a piston working in said cylinder and a fluid inlet chamber communicating with said cylinder and receiving excess lubricant passing said piston from said crank chamber, of means including a passage establishing communication from said inlet chamber to said crank chamber whereby the fluid lubricant entering said inlet chamber is returned to the crank chamber, and means for equalizing the pressures of the fluid in said inlet chamber and said crank chamber including a conduit communicating with said chamber through spaced openings and having an inlet port so disposed in the conduit as to so affect the sound producing pulsating fluid in said conduit and chambers as to substantially silence said fluid.

15. The combination with a fluid compressor having a crank chamber, a cylinder, a piston working in said cylinder and a fluid inlet chamber communicating with said cylinder and receiving excess lubricant passing said piston from said crank chamber, of means including a passage establishing communication from said inlet chamber to said crank chamber whereby the fluid lubricant entering said inlet chamber is returned to the crank chamber, and means including a conduit establishing communication between said inlet chamber and said crank chamber whereby the fluid pressures within said chambers are so mutually affected as to render them ineffective to prevent flow of lubricant through said passage from said inlet chamber to said crank chamber.

16. The combination with a fluid compressor having a crank chamber, a cylinder, a piston working in said cylinder and a fluid inlet chamber communicating with said cylinder and receiving excess lubricant passing said piston from said crank chamber, of means including a passage establishing communication from said inlet chamber to said crank chamber whereby the fluid lubricant entering said inlet chamber is returned to the crank chamber, means including a conduit communicating with said inlet chamber and said crank chamber for equalizing the pressures therein, and means for silencing the air stream in the conduit and said chamber including a conduit open to the atmosphere and communicating with said conduit and having a flow area of such proportions that a constant flow of air through the second said conduit into the first said conduit is maintained.

BURTON S. AIKMAN.